Patented May 22, 1945

2,376,607

UNITED STATES PATENT OFFICE 2,376,607

PROTEIN-CONTAINING PLASTIC COMPOSITIONS

James H. Lum and Rodger L. Schaefer, Dayton, Ohio, assignors to Monsanto Chemical Company, St. Louis, Mo., a corporation of Delaware No Drawing. Application December 31, 1940, Serial No. 372,498

14 Claims. (Cl. 260—7)

This invention relates to filling material for plastic compositions in general and for molding compositions in particular.

It is an object of this invention to provide new and improved filling material for plastic compositions. It is a further object to provide molding compositions and articles prepared therefrom with greatly improved properties. Another object is to provide thermosetting molding compositions with increased flow. A further object is to prepare molded articles of decreased cost. Other objects will become apparent hereinafter.

According to the present invention, it has been found that cocoa bean material is an admirable filling material for plastic compositions. Thus, included within the scope of the present invention are compositions comprising said cocoa bean material and such basic plastic materials as phenolaldehyde resins, urea aldehyde resins, vinyl resins, alkyd resins, cellulose derivatives and the like.

It is, of course, understood that the cocoa bean material can be subjected to purification and/or other treatment before it is employed according to this invention. The exact pre-treatment of the cocoa bean material will depend, for example, on the particular properties desired in the plastic composition in which it is to be incorporated. Thus, while cocoa bean material per se, pulverized in a suitable manner, may be employed in preparing the new and improved compositions of this invention, it is generally desirable to remove the oils and fats from the cocoa bean by a suitable defatting process. This may be accomplished, for example, by expressing and/or extracting with a suitable solvent the oils and fats present in the beans.

The following specific examples are illustrative of the new and useful improvements obtained by employing the new fillers of the present invention and, being presented for purposes of illustration only, are not to be construed as limitative of the invention. The parts are by weight in these examples. The cure times given in these examples represent the minimum molding periods necessary to prevent blistering when the material is molded in a cup-shaped mold at 160° C. and 2000 pounds per square inch pressure. The flows were determined on an Olsen-Bakelite flow tester at 150° C. and 700 pounds per square inch pressure. The water absorption values represent the increase in weight of a molded disc ⅛ of an inch in thickness and 2 inches in diameter after 48 hours exposure to water at 25° C.

Example 1

| | Parts |
|---|---|
| Phenol formaldehyde resin | 47.5 |
| Cocoa bean material | 47.5 |
| Burnt umber | 5.0 |
| Zinc stearate | 2.0 |

The phenol formaldehyde resin employed in this example was a typical one-stage molding resin. The cocoa bean material was suitably pulverized and substantially free from oils and fats. The several ingredients were mixed on differential milling rolls for substantially 2½ minutes at a front roll temperature of substantially 250° F. and a back roll temperature of substantially 315° F. The molding composition thus produced had a flow of 0.65 inch and a cure time of 40 seconds. Articles molded from this material gave a water absorption value of 0.62%. It can be readily seen that the molding composition in the foregoing example containing the new filling material of the present invention possesses a remarkable flow despite the employment of a long rolling period at high temperatures, as well as a rapid cure and a low water absorption value.

Another example illustrative of the improvements obtained according to this invention is the following.

Example 2

| | Parts |
|---|---|
| Phenol formaldehyde resin | 47.5 |
| Wood flour | 17.5 |
| Cocoa bean material | 30.0 |
| Burnt umber | 5.0 |

The phenol formaldehyde resin employed in this example was a typical two-stage molding resin taken after the addition of hexamethylenetetramine. The cocoa bean material was similar to that employed in Example 1, but, as can be seen, wood flour was substituted for a minor proportion of said cocoa bean material. The several ingredients were mixed on differential milling rolls for substantially 2 minutes at a front roll temperature of substantially 210° F. and a back roll temperature of substantially 290° F. The molding composition thus produced and articles molded therefrom were found to possess substantially the same properties as the product in Example 1.

In order to compare the product in Example 2 with prior products, a composition was prepared similar to that in Example 2 but, in which 47.5 parts of wood flour replaced the 30 parts of cocoa bean material and the 17.5 parts of wood flour employed in Example 2. This product, while giving substantially the same cure time and water absorption values was inferior in flow and gave a flow value only 63% of that in Example 2. In addition, another composition was prepared similar to that in Example 2, but in which the cocoa bean material of Example 2 was replaced by an oil-free soya bean material sold on the market as "Prosoy G." This product, while giving a flow and cure time substantially that of the product in Example 2 was very poor in water resistance and gave a water absorption value more than twice that of the product in Example 2.

The foregoing examples clearly show the unexpectedly high flow of phenol formaldehyde molding compositions containing cocoa bean material as at least a portion of the filler and without impairment of the cure time and water resistance. High flow values are particularly desirable in the molding of large articles such as radio cabinets. Heretofore, it has been necessary to increase the resin content of a phenolic resin molding compound in order to obtain such high flow values. This is very undesirable since the resin component is by far the most expensive component in these compositions. Conversely, in the molding of articles requiring a normal flow, the use of cocoa bean material as at least a portion of the filler makes possible a reduction in the proportion of the relatively expensive resin component.

The scope of the present invention is limited solely by the claims attached hereto.

What is claimed:

1. A method of increasing the flow of a thermosetting synthetic organic resin molding composition comprising employing protein-containing cocoa-bean material as at least a portion of the filler.

2. A method of increasing the flow of thermosetting phenol formaldehyde molding compositions comprising employing oil and fat-free protein-containing cocoa bean material as at least a portion of the filler.

3. A new composition of matter comprising a thermosetting synthetic organic resin and protein-containing cocoa bean material.

4. An improved molding composition comprising a thermosetting synthetic organic aldehyde type of resin and oil and fat-free protein-containing cocoa bean material.

5. An improved molding composition comprising a thermosetting phenol formaldehyde resin and oil and fat-free protein-containing cocoa bean material.

6. A thermosetting phenol formaldehyde molding composition with increased flow comprising oil and fat free protein-containing cocoa bean material as at least a portion of the filler.

7. A process of preparing a new molded article comprising mixing thermosetting synthetic organic resin and protein-containing cocoa bean material, and molding the resulting composition under pressure.

8. A process of preparing a molded article comprising mixing a thermosetting synthetic organic aldehyde type of resin and oil and fat-free protein-containing cocoa bean material, and molding the resulting composition under heat and pressure.

9. A process of preparing a molded article comprising mixing a thermosetting phenol-formaldehyde resin and oil and fat-free protein-containing cocoa bean material, and molding the resulting composition under heat and pressure.

10. A molded article comprising a mixture of a thermosetting synthetic organic formaldehyde type of resin and oil and fat-free protein-containing cocoa bean material united under heat and pressure into the desired form.

11. A molded article comprising a mixture of a thermosetting phenol-formaldehyde resin and oil and fat-free cocoa bean material united under heat and pressure into the desired form.

12. An improved molding composition comprising a thermosetting synthetic organic resin and a fat-free cocoa bean material, said cocoa bean material being present in an amount ranging from 46.5 to 30% of the total weight of the molding composition.

13. An improved molding composition comprising substantially equal proportions of a thermosetting synthetic organic resin and a fat-free cocoa bean material.

14. An improved molding composition comprising a thermosetting phenol formaldehyde resin and a fat-free cocoa bean material, said cocoa bean material being present in an amount ranging from 46.5 to 30% of the total weight of the molding composition.

JAMES H. LUM.
RODGER L. SCHAEFER.